United States Patent
Bugos et al.

(10) Patent No.: US 8,997,463 B2
(45) Date of Patent: Apr. 7, 2015

(54) REDUCTANT DELIVERY UNIT FOR AUTOMOTIVE SELECTIVE CATALYTIC REDUCTION WITH REDUCING AGENT HEATING

(71) Applicant: Continental Automotive Systems, Inc., Auburn Hills, MI (US)

(72) Inventors: Stephen C. Bugos, Poquoson, VA (US); Michael J. Hornby, Williamsburg, VA (US); Perry Czimmek, Williamsburg, VA (US); Keith Shaw, Yorktown, VA (US); Willem Nicolaas van Vuuren, Yorktown, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 43 days.

(21) Appl. No.: 13/864,301

(22) Filed: Apr. 17, 2013

(65) Prior Publication Data
US 2014/0314644 A1 Oct. 23, 2014

(51) Int. Cl.
*F01N 3/00* (2006.01)
*F01N 3/20* (2006.01)
*B01D 53/94* (2006.01)

(52) U.S. Cl.
CPC ............ *F01N 3/208* (2013.01); *B01D 53/9495* (2013.01)

(58) Field of Classification Search
USPC ............ 60/274, 286, 295, 297, 300, 301, 303
See application file for complete search history.

(56) References Cited

U.S. PATENT DOCUMENTS

| | | | | |
|---|---|---|---|---|
| 6,895,747 | B2 * | 5/2005 | Upadhyay et al. | 60/286 |
| 7,017,335 | B2 * | 3/2006 | Huber et al. | 60/286 |
| 7,481,376 | B2 | 1/2009 | Hornby et al. | |
| 7,644,577 | B2 * | 1/2010 | Linna et al. | 60/286 |
| 7,677,468 | B2 | 3/2010 | Hornby et al. | |
| 7,798,131 | B2 | 9/2010 | Hornby | |
| 8,024,922 | B2 * | 9/2011 | Van Vuuren et al. | 60/286 |
| 8,087,239 | B2 | 1/2012 | Bugos et al. | |
| 8,171,722 | B2 * | 5/2012 | Rodman et al. | 60/286 |
| 8,261,537 | B2 * | 9/2012 | Osbat et al. | 60/286 |
| 8,701,389 | B2 * | 4/2014 | Thomas et al. | 60/286 |

OTHER PUBLICATIONS

Xu et al, "Laboratory and Engine Study of Urea-Related Deposits in Diesel Urea-SCR After-Treatment Systems", SAE-2007-01-1582, Apr. 16-19, 2007.
Gerhart et al., "Development of a 3rd Generation SCR NH3-Direct Dosing System for Highly Efficient DeNOx", SAE 2012-01-1078, Apr. 16, 2012.

* cited by examiner

*Primary Examiner* — Binh Q Tran

(57) ABSTRACT

A reductant delivery unit for selective catalytic reduction (SCR) after-treatment for vehicles includes a solenoid operated fluid injector associated with an exhaust gas flow path upstream of a SCR catalytic converter. The fluid injector has a fluid inlet and a fluid outlet. The fluid inlet receiving a source of reducing agent and the fluid outlet communicating with the exhaust gas flow path so that the fluid injector controls injection of urea solution into the exhaust gas flow path. The fluid injector has an inlet tube for directing the reducing agent between the fluid inlet and the fluid outlet. A shield is fixed with respect to the fluid injector and surrounds at least portions of the fluid injector. A coil heater is integral with the fluid injector and is constructed and arranged, when energized, to inductively heat the inlet tube to thereby heat the reducing agent within the inlet tube.

19 Claims, 2 Drawing Sheets

REDUCTANT DELIVERY UNIT FOR AUTOMOTIVE SELECTIVE CATALYTIC REDUCTION WITH REDUCING AGENT HEATING

FIELD

The invention relates to a reductant delivery unit (RDU) that supplies reducing agent to an engine exhaust system and, more particularly, to an RDU that directly heats the reducing agent just prior to injection.

BACKGROUND

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution (CO $(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide (CO2). The ammonia resulting from the thermolysis and the hydrolysis then undergoes a catalyzed reaction with the nitrogen oxides as described previously.

In today's production systems, the RDU is typically mounted under the body of the vehicle, in a downstream location on the exhaust line. This results in relatively low temperatures at the SCR catalyst, longer light-off times, and low conversion efficiency of the $NO_x$. The lower exhaust temperatures (lower enthalpy) also inhibit the thermal decomposition of the urea thermolysis reaction, or in the case of the thermolysis HNCO byproduct, the low temperatures also inhibit the hydrolysis reaction. The result is the presence of excessive urea and/or HNCO at the SCR catalyst and an insufficient quantity of ammonia to participate in the NOx reduction reactions. A good example of this situation was presented in SAE 2007-01-1582: "Laboratory and Engine Study of Urea-Related Deposits in Diesel Urea-SCR After-Treatment Systems". Engine dynamometer data shows that at exhaust temperatures below 300° C., a measurable proportion of the injected urea remains untransformed into either HNCO or NH3.

There are also activities in the industry examining the potential of alternative reducing agents. Some of these agents (e.g., Guanidinium Formate) exhibit higher decomposition temperatures than those of urea. In order for these alternatives to be viable, they require preheating, typically in a dedicated reformer located in a bypass flow passage off the main exhaust. A description of one such approach is provided in in SAE 2012-01-1078, "Development of a 3rd Generation SCR NH3-Direct Dosing System for Highly Efficient DeNOx". During the startup phase, these reformer concepts typically rely on electrical heating of the bypass gas flow and the use of hydrolysis reaction catalysts to ensure the proper conditions for transformation of the carriers into ammonia.

Thus, there is a need to directly heat the reducing agent within an RDU just prior to injection to allow earlier onset of injection after engine startup, thereby reducing NOx emissions further.

SUMMARY

An object of the invention is to fulfill the needs referred to above. In accordance with the principles of the present invention, this objective is obtained by providing a reductant delivery unit for selective catalytic reduction (SCR) after-treatment for vehicles. The reductant delivery unit includes a solenoid operated fluid injector constructed and arranged to be associated with an exhaust gas flow path upstream of a SCR catalytic converter. The fluid injector has a fluid inlet and a fluid outlet. The fluid inlet is constructed and arranged to receive a source of reducing agent and the fluid outlet is constructed and arranged to communicate with the exhaust gas flow path so that the fluid injector controls injection of the reducing agent into the exhaust gas flow path. The fluid injector has an inlet tube for directing the reducing agent between the fluid inlet and the fluid outlet. A shield is fixed with respect to the fluid injector and surrounds at least portions of the fluid injector. A coil heater is integral with the fluid injector and is constructed and arranged, when energized, to inductively heat the inlet tube to thereby heat the reducing agent within the inlet tube.

In accordance with another aspect of a disclosed embodiment, a method of delivering a reducing agent to an exhaust gas flow path of a vehicle for selective catalytic reduction (SCR) after-treatment associates a solenoid operated fluid injector with the exhaust gas flow path upstream of a SCR catalytic converter. The fluid injector has a fluid inlet and a fluid outlet. The fluid inlet receives a source of reducing agent. The fluid outlet communicates with the exhaust gas flow path. The fluid injector has an inlet tube for directing the reducing agent between the fluid inlet and the fluid outlet. The reducing agent is heated while within the inlet tube. The fluid injector is then operated to inject the heated reducing agent into the exhaust gas flow path.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
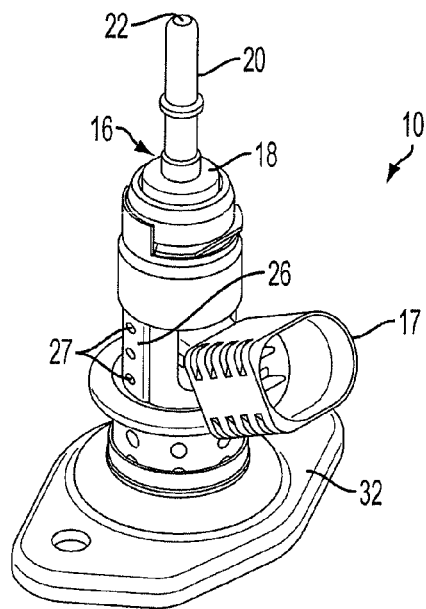
FIG. 1 is a perspective view of an RDU provided in accordance with an embodiment.
Figure 2:
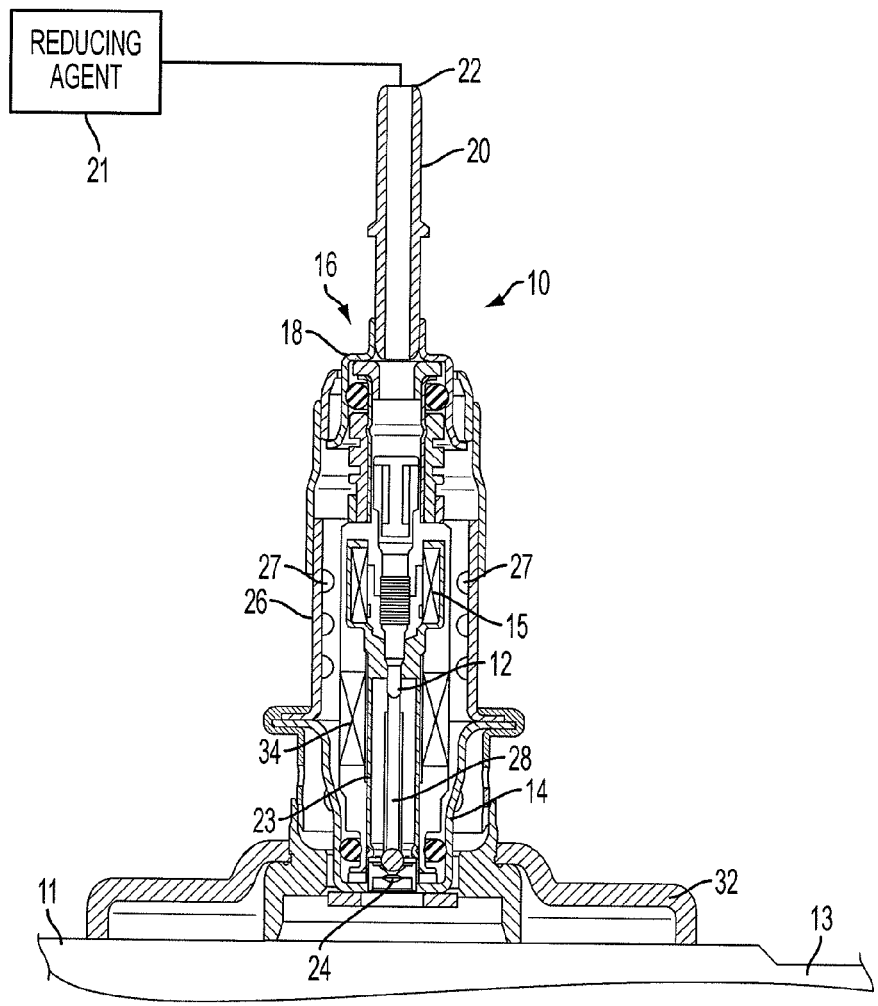
FIG. 2 is a sectional view of the RDU of FIG. 1.

With reference to FIGS. 1 and 2, an RDU is shown, generally indicated at 10, in accordance with an embodiment of the invention. The RDU 10 can be employed in a system of the type disclosed in U.S. Patent Application Publication No. 2008/0236147 A1, the contents of which is hereby incorporated by reference into this specification.

The RDU 10 includes a solenoid fluid injector 12 that provides a metering function of fluid and provides the spray preparation of the fluid into the exhaust gas flow path 11 of a vehicle in a dosing application. Thus, the fluid injector 12 is constructed and arranged to be associated with the exhaust gas flow path 11 upstream of a SCR catalytic converter 13. The fluid injector 12 is preferably a gasoline, electrically operated, solenoid fuel injector such as the type disclosed in U.S. Pat. No 6,685,112, the content of which is hereby incorporated by reference into this specification. Thus, a first electromagnetic coil 15 (FIG. 2) operates the fluid injector 12 in the conventional manner when energized via electrical connector 17 (FIG. 1).

The fluid injector 12 is disposed inside of an interior carrier 14. An inlet cup structure, generally indicated at 16, includes an inlet cup 18 and an inlet connector 20 integral with or coupled to the inlet cup 18. The inlet connector 20 defines the inlet 22 of the injector 12. The inlet connector 20 is in communication with a source of reducing agent 21 such as urea solution that is fed to the injector 12 via the inlet tube 23 to be injected from an outlet 24 of the injector 12. Thus, the inlet tube 23 directs urea solution between the fluid inlet 22 and the fluid outlet 24.

An injector shield 26 is coupled to the injector carrier 14 so that the shield 26 is fixed with respect to the injector 12. The shield 26 surrounds at least a portion of the injector 12 and isolates it from environmental factors such as sprayed gravel, high pressure water jets, splashes, etc. The shield 26 also provides structural support to the RDU 10. Openings 27 are provided through the shield 26 for air cooling of the fluid injector 12.

Figure 3:
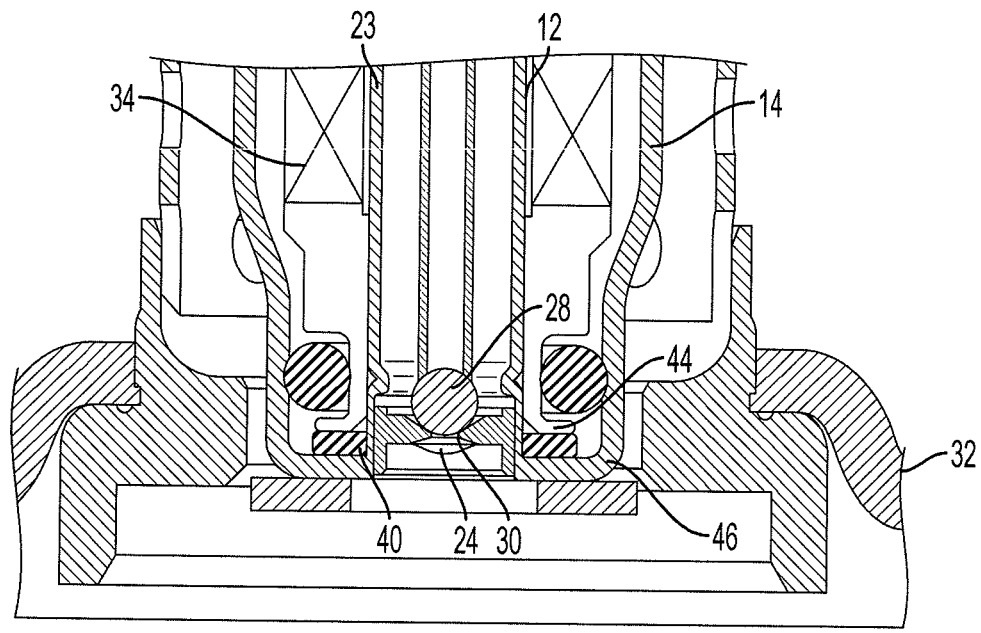
FIG. 3 is an enlarged view of an inlet end of the RDU of FIG. 2.

The urea solution is fed through the inlet 22 and is delivered under pressure to the solenoid fluid injector 12. The urea solution is metered and exits the injector 12 at outlet 24 in the conventional manner, due to movement of the solenoid operated valve 28 with respect to the seat 30 (FIG. 3). The RDU 10 is mounted to the exhaust system with a flange 32, preferably with bolts (not shown). Of course, other mounting methods can be used such as clamping or other mechanical joining techniques.

In accordance with the embodiment, to heat the urea solution upon demand and prior to injection, an inductive coil heater 34 is provided in the solenoid injector 12. The inductive coil heater 34 is electrically operated via power applied to the electrical connector 17. Thus, when energized, the coil heater 34 provides an electromagnetic field to inductively heat the injector inlet tube 23 and thus heat the urea solution therein. Such heating of the urea solution just prior to injection allows for earlier onset of injection after engine startup, thereby reducing NOx emissions further.

Figure 4:
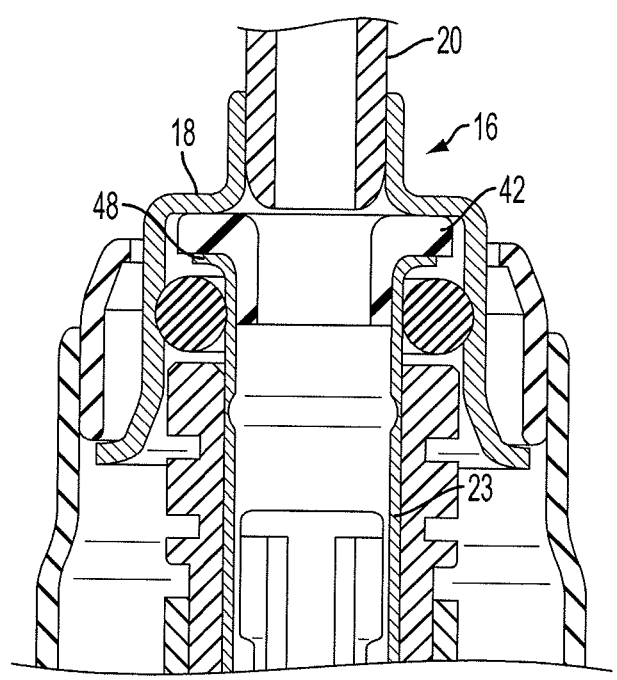
FIG. 4 is an enlarged view of an outlet end of the RDU of FIG. 2.

In order to maintain the injector 12 in a fixed position an injector bottom stop 40 (FIG. 3) and a compressible upper stop 42 (FIG. 4) are provided. The bottom stop 40 is constructed and arranged with respect to an end of the injector near the fluid outlet 24 such that during operation of the RDU 10, positive fluid pressure will act upon the injector 12 to retain it against the non-metallic bottom stop 40. The embodiment of FIG. 3 resolves a problem related to the manufacture of the injector 12, which results in a weld bead on the side of the inlet tube 23 towards the injector tip, thereby making it impractical to seat the lower O-ring gland 44 directly against the thin-wall housing 46. It is recognized however, that other embodiments that resolve this problem allowing for elimination of the bottom stop are within the scope of this invention.

The compliant, preferably elastomer, upper stop 42 is intended to protect against metal-to-metal contact between the flange 48 of the injector inlet tube 23 and the inlet cup 18, during assembly, or in the event vibrational solicitations are sufficient to lift the injector 12 off the bottom stop 40. A secondary function of the upper stop 42 is to provide a first sealing barrier for the working fluid.

The operation of the fluid heater 34 is upon demand as is determined by engine operating conditions, typically via algorithms encoded in a central control unit (not shown). The direct heating of the RDU 10 at the injection point results in more efficient heat transfer and production of the desired reductant.

Although urea solution has been disclosed as the reducing agent 21, it can be appreciated that other reducing agents can be used such as Guanidinium Formate, since the agent 21 is now heated upon injection.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reductant delivery unit for selective catalytic reduction (SCR) after-treatment for vehicles, the reductant delivery unit comprising:

a solenoid operated fluid injector having an electromagnetic coil and constructed and arranged to be associated with an exhaust gas flow path upstream of a SCR catalytic converter, the fluid injector having a fluid inlet and a fluid outlet, the fluid inlet being constructed and arranged to receive a source of reducing agent and the fluid outlet being constructed and arranged to communicate with the exhaust gas flow path so that actuation of the electromagnetic coil of the fluid injector controls injection of the reducing agent into the exhaust gas flow path, the fluid injector having an inlet tube for directing the reducing agent between the fluid inlet and the fluid outlet, a shield fixed with respect to the fluid injector and surrounding at least portions of the fluid injector including the electromagnetic coil; and a coil heater integral with the fluid injector and separate from the electromagnetic coil, the coil heater being constructed and arranged, when energized, to inductively heat the inlet tube to thereby heat the reducing agent within the inlet tube.

2. The delivery unit of claim 1, wherein the fluid injector includes an inlet cup and a tube connector, the tube connector defining the fluid inlet.

3. The delivery unit of claim 2, further comprising a compressible stop between a portion of the inlet cup and a portion of the inlet tube to prevent contact between the portion of the inlet cup and the portion of the inlet tube.

4. The delivery unit of claim 3, further comprising a second stop constructed and arranged with respect to an end of the injector near the fluid outlet such that during operation, positive fluid pressure acts upon the injector to retain it against the second stop.

5. The delivery unit of claim 3, wherein the compressible stop is constructed and arranged to provide a sealing barrier for the reducing agent.

6. The delivery unit of claim 1, wherein the shield includes a plurality of openings there-through for air cooling of the fluid injector.

7. The delivery unit of claim 1, further comprising a flange constructed and arranged to mount the delivery unit to the exhaust gas flow path.

8. The delivery unit of claim 1, in combination with the source of reducing agent feeding the fluid inlet.

9. The delivery unit of claim 8, wherein the reducing agent is urea solution.

10. The delivery unit of claim 8, wherein the reducing agent is Guanidinium Formate.

11. A method of delivering a reducing agent to an exhaust gas flow path of a vehicle for selective catalytic reduction (SCR) after-treatment, the method comprising the steps of:
associating a solenoid operated fluid injector, having an electromagnetic coil, with the exhaust gas flow path upstream of a SCR catalytic converter, the fluid injector having a fluid inlet and a fluid outlet, the fluid inlet receiving a source of reducing agent, the fluid outlet communicating with the exhaust gas flow path, the fluid injector having an inlet tube for directing the reducing agent between the fluid inlet and the fluid outlet,
providing a shield about at least a portion of the fluid injector including the electromagnetic coil,
heating the reducing agent while within the inlet tube with a source of heat other than from the electromagnetic coil; and
operating the fluid injector to inject the heated reducing agent into the exhaust gas flow path.

12. The method of claim 11, wherein the fluid injector includes an inlet cup and a tube connector, the tube connector defining the fluid inlet receiving the source of reducing agent.

13. The method of claim 12, further comprising the step of:
providing a compressible stop between a portion of the inlet cup and a portion of the inlet tube to prevent contact between the portion of the inlet cup and the portion of the inlet tube.

14. The method of claim 13, further comprising the step of:
providing a second stop associated with an end of the injector near the fluid outlet such that during operation, positive fluid pressure acts upon the injector to retain it against the second stop.

15. The method of claim 13, further comprising the step of:
ensuring that the compressible stop provides a seal for the reducing agent.

16. The method of claim 11, further comprising:
ensuring that the shield enables air-cooling of the injector.

17. The method of claim 11, wherein the associating step includes using a flange to mount the injector to the exhaust gas flow path.

18. The method of claim 11, wherein the reducing agent is urea solution.

19. The method of claim 11, wherein the reducing agent is Guanidinium Formate.

* * * * *